(12) United States Patent
Rodrigues

(10) Patent No.: US 11,163,178 B1
(45) Date of Patent: Nov. 2, 2021

(54) VOLUMETRIC DISPLAY USING NOBLE GASSES

(71) Applicant: Toyota Motor Engineering & Manufacturing North America, Inc., Plano, TX (US)

(72) Inventor: Sean Rodrigues, Ann Arbor, MI (US)

(73) Assignee: TOYOTA MOTOR ENGINEERING AND MANUFACTURING NORTH AMERICA, INC., Plano, TX (US)

(*) Notice: Subject to any disclaimer, the term of this patent is extended or adjusted under 35 U.S.C. 154(b) by 0 days.

(21) Appl. No.: 16/851,694

(22) Filed: Apr. 17, 2020

(51) Int. Cl.
 *G02B 30/56* (2020.01)
 *B60K 35/00* (2006.01)
 *G02B 26/08* (2006.01)

(52) U.S. Cl.
 CPC ............ *G02B 30/56* (2020.01); *B60K 35/00* (2013.01); *G02B 26/0875* (2013.01); *B60K 2370/1531* (2019.05)

(58) Field of Classification Search
 CPC ...... G03B 21/56; G03B 21/62; G03B 21/145; G03B 21/562; G03B 21/2033; G02B 26/0816; G02B 26/0825; G02B 26/0833; G02B 26/0875; G02B 2207/101; G02B 2207/107; G02B 2207/109; G02B 2207/114; B60K 35/00
 See application file for complete search history.

(56) References Cited

U.S. PATENT DOCUMENTS

| | | | |
|---|---|---|---|
| 5,072,215 A | 12/1991 | Brotz | |
| 5,572,375 A | 11/1996 | Crabtree, IV | |
| 5,764,317 A | 6/1998 | Sadovnik et al. | |
| 7,446,733 B1 | 11/2008 | Hideyoshi | |
| 9,458,989 B2 | 10/2016 | Hsu | |
| 9,829,612 B1 | 11/2017 | Koudsi et al. | |
| 10,129,517 B2 | 11/2018 | Smalley et al. | |
| 10,228,653 B2 | 3/2019 | Ochiai et al. | |
| 2005/0145790 A1 | 7/2005 | Wang | |

(Continued)

FOREIGN PATENT DOCUMENTS

| | | |
|---|---|---|
| AU | 2005287885 B2 | 6/2011 |
| EP | 3457430 A1 | 3/2019 |

(Continued)

OTHER PUBLICATIONS

Geng, Jason, "Three-Dimensional Display Technologies," Optical Society of America, Advances in Optics and Photonics, vol. 5, Issue 4, 2013, p. 456-535.

*Primary Examiner* — Sultan Chowdhury

(74) *Attorney, Agent, or Firm* — Jordan IP Law, LLC

(57) ABSTRACT

Methods and systems may provide for 3D volumetric displays. Such 3D volumetric displays may include a transparent enclosed volume holding a noble gas as a gain medium. Two electrodes positioned on opposing sides of the transparent enclosed volume, may apply a voltage to excite electrons of the gain medium to an excited state. A pump laser may emit a laser beam into the gain medium at a wavelength that has an energy below an absorption line of the gain medium to allow for photon collision while also allowing the laser beam to enter the gain medium. A lens may focus the laser beam to a focused spot within the transparent enclosed volume and move the focused spot as a three-dimensionally scanned voxel to produce a 3D image.

20 Claims, 13 Drawing Sheets

(56) References Cited

U.S. PATENT DOCUMENTS

| | | | |
|---|---|---|---|
| 2008/0297593 A1 | 12/2008 | Debevec et al. | |
| 2012/0008103 A1 | 1/2012 | Lalley et al. | |
| 2016/0370596 A1 | 12/2016 | Yamaichi | |
| 2018/0252934 A1* | 9/2018 | Kim | G02B 30/35 |
| 2018/0267326 A1* | 9/2018 | Broadbent | G02B 30/50 |
| 2020/0310144 A1* | 10/2020 | Joseph | G02B 30/26 |

FOREIGN PATENT DOCUMENTS

| | | |
|---|---|---|
| WO | 2005099386 A2 | 10/2005 |
| WO | 2018057902 A1 | 3/2018 |

* cited by examiner

VOLUMETRIC DISPLAY USING NOBLE GASSES

TECHNICAL FIELD

Embodiments generally relate to three-dimensional (3D) volumetric displays. More particularly, embodiments relate to volumetric displays using noble gasses.

BACKGROUND

There are many technologies for creation of a three-dimensional (3D) image. Typically, these technologies for creation of a 3D image fall into three approaches: free space displays, swept volume displays, and static volumetric displays. Due to these technologies taking distinct approaches, the technological approaches utilized for free space displays and/or swept volume displays often are not applicable or easily adapted for static volumetric displays.

Free space displays often operate in open air, with no barrier between the 3D image and a user. For example, such free space displays may utilize trapped particle, free particle, or plasma emission technologies to create the 3D image.

Swept volume displays often operate with a rotating emissive or reflective screen. Such a rotating emissive or reflective screen may fuse a series of slices of the 3D object into a single 3D image by creating an optical illusion that relies on the human persistence of vision. For example, such swept volume displays may utilize spinning LEDs, illuminated spinning paddles, or translating projection surfaces to create the 3D image.

Static volumetric displays are devices that display a 3D image within a static volume. There are many different methods of producing a volumetric display, such as suspending particles and reflecting a scanned laser off the suspended particles, for example. However, such suspending particle-type volumetric displays may not be practical due to the difficulty in controlling the particle across large volumes and moving the particle at high speeds.

BRIEF SUMMARY

In one embodiment, an apparatus for 3D volumetric displays includes a transparent enclosed volume, two electrodes, a single pump laser, and a lens. The transparent enclosed volume holds a noble gas as a gain medium. The two electrodes are positioned on opposing sides of the transparent enclosed volume. The two electrodes configured to apply a voltage to excite electrons of the gain medium to an excited state. The single pump laser is configured to emit a laser beam into the gain medium at a wavelength that has an energy below an absorption line of the gain medium, to allow for photon collision while also allowing the laser beam to enter the gain medium. The lens is configured to focus the laser beam to a focused spot within the transparent enclosed volume. The lens is configured to move the focused spot at various depths, and the pump laser is configured to move the focused spot within the gain medium as a three-dimensionally scanned voxel to produce a 3D image. The gain medium with excited electrons is configured to receive the laser beam having a pumped wavelength at a first wavelength and configured to emit a second wavelength that is one-half of the first wavelength as luminescence, where the luminescence is in response to excitation from the single pump laser.

In some implementations of the apparatus, the enclosed volume holds the noble gas as the gain medium without suspended particles.

In some implementations of the apparatus, the enclosed volume holds the noble gas as the gain medium without suspended fluorophore particles.

In some implementations of the apparatus, the voltage is applied to the two electrodes to reach but not exceed a level where the noble gas begins to glow.

In some implementations of the apparatus, no heat is applied to excite electrons of the gain medium.

In some implementations of the apparatus, the excited state is a metastable state and the luminescence is in response to two-photon excitation from the pump laser.

In some implementations of the apparatus, the laser beam will be absorbed at an edge of the gain medium when pumping at a wavelength that is within the absorption line of the gain medium.

In some implementations of the apparatus, no emission occurs when the laser beam is not focused within the gain medium.

In some implementations of the apparatus, different pumping wavelengths are used to create different wavelengths of illumination, where a blue-type second wavelength of between 450 nanometers and 495 nanometers is emitted in response to a pumped first wavelength of between 900 nanometers and 990 nanometers, where a green-type second wavelength of between 495 nanometers and 570 nanometers is emitted in response to a pumped first wavelength of between 990 nanometers and 1140 nanometers, and where a red-type second wavelength of between 620 nanometers and 750 nanometers is emitted in response to a pumped first wavelength of between 1240 nanometers and 1500 nanometers.

In another embodiment, a system includes a vehicle and a 3D volumetric display apparatus coupled to the vehicle. The 3D volumetric display includes a transparent enclosed volume, two electrodes, a single pump laser, and a lens. The transparent enclosed volume holds a noble gas as a gain medium. The two electrodes are positioned on opposing sides of the transparent enclosed volume. The two electrodes are configured to apply a voltage to excite electrons of the gain medium to an excited state. The single pump laser is configured to emit a laser beam into the gain medium at a wavelength that has an energy below an absorption line of the gain medium to allow for photon collision while also allowing the laser beam to enter the gain medium. The lens is configured to focus the laser beam to a focused spot within the transparent enclosed volume. The lens is configured to move the focused spot at various depths, and the pump laser is configured to move the focused spot within the gain medium as a three-dimensionally scanned voxel to produce a 3D image. The gain medium with excited electrons is configured to receive the laser beam having a pumped wavelength at a first wavelength and configured to emit a second wavelength that is one-half of the first wavelength as luminescence, where the luminescence is in response to excitation from the single pump laser.

In some implementations of the system, the enclosed volume holds the noble gas as the gain medium without suspended fluorophore particles.

In some implementations of the system, the voltage is applied to the two electrodes to reach but not exceed a level where the noble gas begins to glow.

In some implementations of the system, no heat is applied to excite electrons of the gain medium to the excited state.

In some implementations of the system, the excited state is a metastable state and the luminescence is in response to two-photon excitation from the pump laser.

In some implementations of the system, the laser beam will be absorbed at an edge of the gain medium when pumping at a wavelength that is within the absorption line of the gain medium.

In some implementations of the system, no emission occurs when the laser beam is not focused within the gain medium.

In a further embodiment, a method for 3D volumetric display, includes holding a noble gas, via a transparent enclosed volume, as a gain medium; applying a voltage, via two electrodes positioned on opposing sides of the transparent enclosed volume, to excite electrons of the gain medium to an excited state; emitting a laser beam, via a single pump laser, into the gain medium at a wavelength that has an energy below an absorption line of the gain medium to allow for photon collision while also allowing the laser beam to enter the gain medium; and focusing the laser beam, via a lens, to a focused spot within the transparent enclosed volume, where the lens is configured to move the focused spot at various depths, and the pump laser is configured to move the focused spot within the gain medium as a three-dimensionally scanned voxel to produce a 3D image. The gain medium with excited electrons receives the laser beam having a pumped wavelength at a first wavelength and emits a second wavelength that is one-half of the first wavelength as luminescence, where the luminescence is in response to excitation from the single pump laser.

In some implementations of the method, the enclosed volume holds the noble gas as the gain medium without suspended fluorophore particles.

In some implementations of the method, no heat is applied to excite electrons of the gain medium to the excited state.

In some implementations of the method, the excited state is a metastable state and the luminescence is in response to two-photon excitation from the pump laser.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

As described above, suspending particle-type volumetric displays may not be practical due to the difficulty in controlling the particle across large volumes and moving the particle at high speeds.

As will be described in greater detail below, in some implementations disclosed herein, a 3D volumetric display may use noble gasses as a gain medium. Advantageously, in some implementations disclosed herein, such a 3D volumetric display may use noble gasses without suspended particles.

In some examples, the noble gas gain medium may be contained within a transparent enclosure. The enclosure may have two electrodes on opposing sides to apply a voltage to excite electrons. The voltage may be applied at a level that is just before the noble gas begins to glow. Thus, the noble gas may be excited by an applied voltage. A pump laser may be used to pump the gain medium and cause luminescence. The pump laser may be focused into the gain medium. The wavelength of the pump laser is twice the desired emission wavelength. The pump laser and a lens may be used to three-dimensionally scan a 3D image. Different pumping wavelengths may be used to create different wavelengths of illumination (e.g., red, green, yellow, and blue, as well as other colors).

More specifically, methods and systems will be described below that may provide for 3D volumetric displays adapted for use with noble gasses.

Figure 1A:
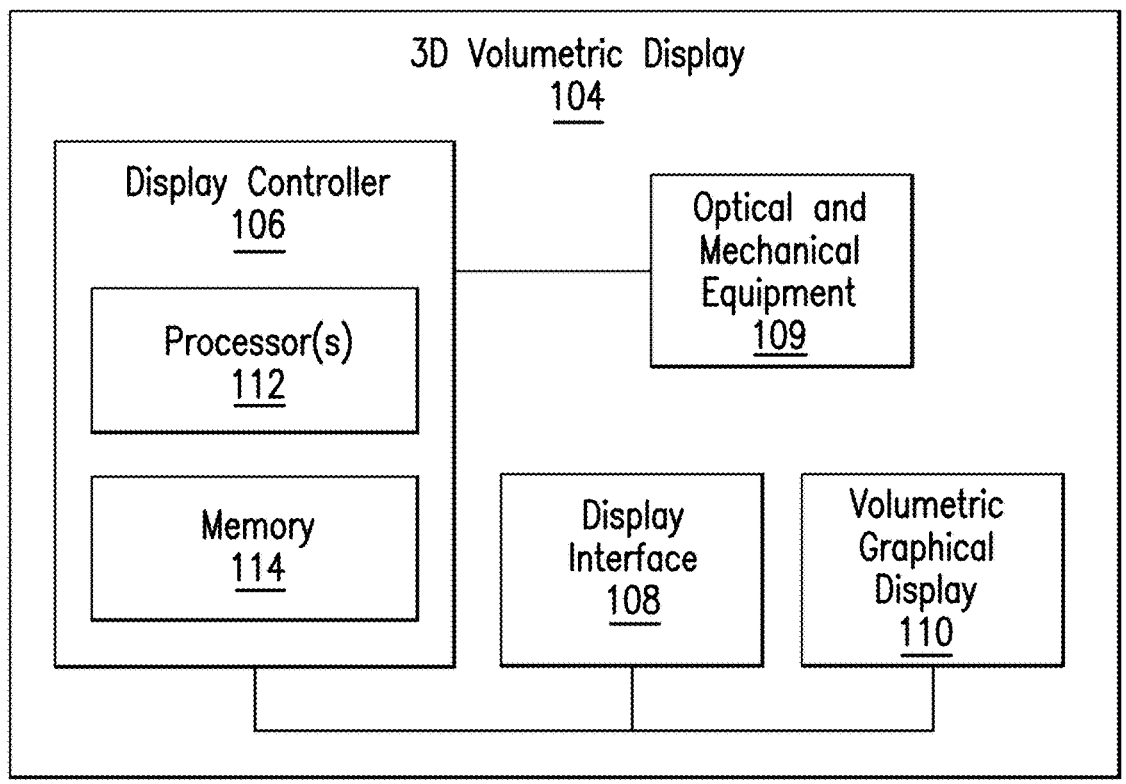
FIG. 1A is a block diagram of an example system of a 3D volumetric display according to an embodiment.

Turning now to FIG. 1A, a system 100 may include a 3D volumetric display 104. The 3D volumetric display 104 may include a display controller 106, a display interface 108, optical and mechanical equipment 109, and a volumetric graphical display 110. The 3D volumetric display 104 may be any type of handheld device, tabletop device, vehicle-installed device, or other form of single computing device, or may be composed of multiple computing devices (e.g., multiple computing devices linked in operative communication with one another).

In some implementations, the display controller 106 may be a processing system and may include a processor 112 coupled to a memory 114. The display controller 106 may also include a graphics processing unit (GPU) with enough bandwidth to accommodate rendering of 3D image and/or video data via the volumetric graphical display 110.

The processor 112 may include an embedded controller, a central processing unit (CPU), any other type of similar device or multiple devices capable of manipulating or processing information, and/or the like, for example. The memory 114 may include a non-volatile memory (NVM), a volatile memory, any other suitable type of storage device, and/or the like, for example. The memory 114 may contain a set of instructions, which when executed by the processor 112, cause the display controller 106 to present image information, such as 3D still images and/or 3D video, on volumetric graphical display 110.

Such a presentation may be initiated in response to user input from display interface 108 to the display controller 106, for example. The display interface 108 may include one or more user interfaces (UI) to receive input from a user and function as a user point of human-computer interaction and communication. The display interface 108 may include a touch screen, keyboard, mouse, physical buttons, physical dials, the like, and/or combinations thereof.

As will be described in greater detail below, the optical and mechanical equipment 109 may include one or more lasers, lenses, mirrors, motors, the like, and/or combinations thereof. For example, the optical and mechanical equipment 109 may include one or more devices for moving optics to focus and direct a laser.

The volumetric graphical display 110 may be configured to present a 3D volumetric image to a user. The volumetric graphical display 110 may be of any suitable shape and/or size. In some examples, the volumetric graphical display 110 may be of a cubic shape, a cuboid shape, or any suitable volumetric shape. In some implementations, the volumetric graphical display 110 may be a static volumetric display. In some implementations, the volumetric graphical display 110 may be free standing or may be shaped to conform to many surfaces (e.g., a ceiling of a room, a wall of a room, and/or a window, and/or the like).

Figure 1B:
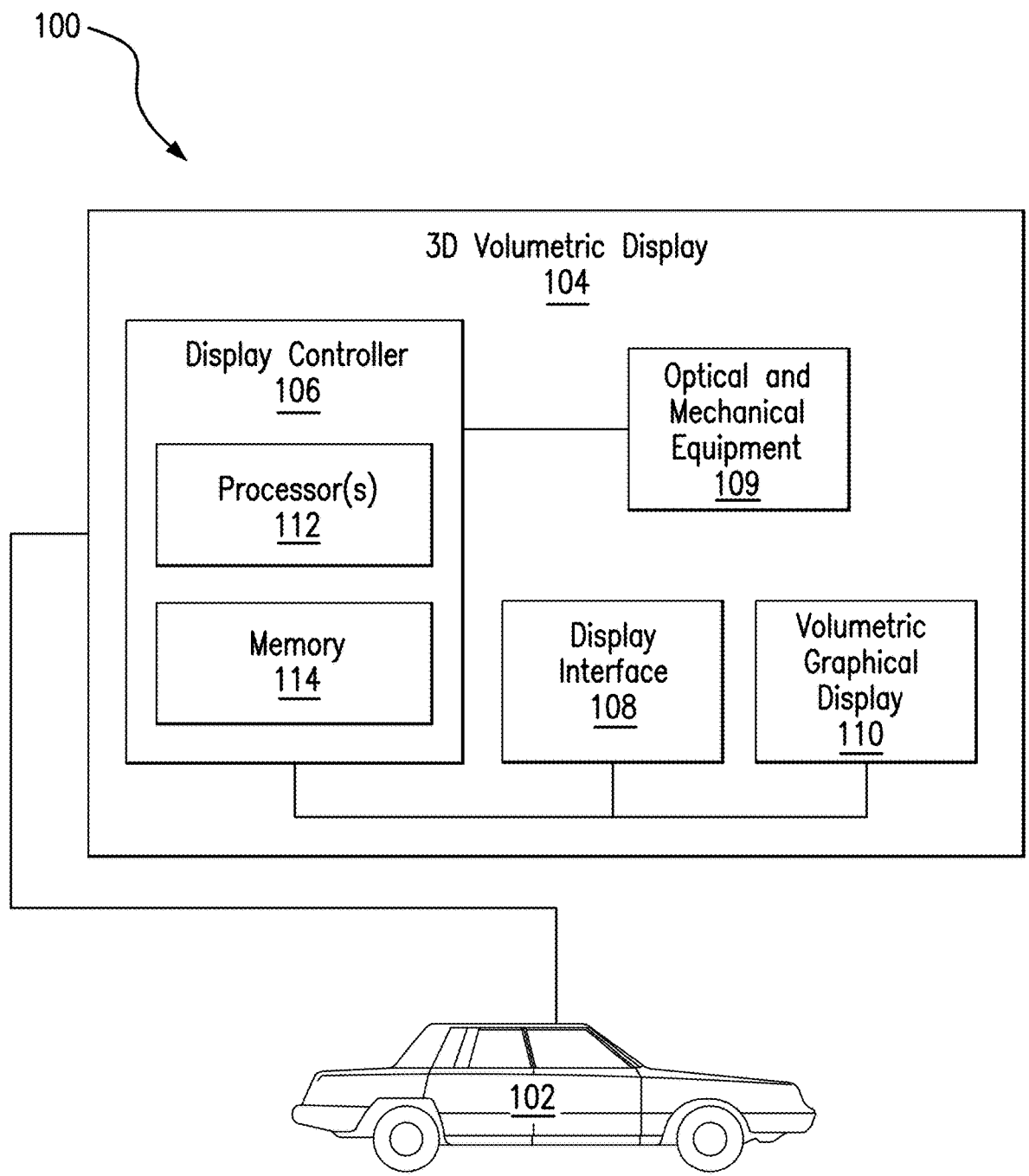
FIG. 1B is a block diagram of an example system of a vehicle installed 3D volumetric display according to an embodiment.

Turning now to FIG. 1B, the system 100 may include a vehicle 102. In such an example, the 3D volumetric display 104 may be directly or indirectly paired with the vehicle 102. For example, the 3D volumetric display 104 may be associate with, coupled to, and/or operatively coupled to the vehicle 102. In one example, the 3D volumetric display 104 may be implemented physically outside of the vehicle 102, yet still function to present the 3D graphical image in the vehicle 102. Alternatively, as illustrated above with respect to FIG. 1, the 3D volumetric display 104 may be implemented as a free standing user-controlled remote device to bring about the 3D graphical image in the vehicle 102. Similarly, the volumetric graphical display 110 portion of the 3D volumetric display 104 may be implemented inside the vehicle 102, whereas the remaining features of the 3D volumetric display 104 may be located outside of the vehicle 102 in a user-controlled remote device. The vehicle 102 may be a personal vehicle such as a car, a taxi, a shuttle, a truck, a van, a sport utility vehicle/SUV, an aircraft, and/or the like, for example. In some implementations, the volumetric graphical display 110 may be shaped to conform to a surface of the vehicle 102 (e.g., a surface in the interior cabin of the vehicle, such as a ceiling or a window of the vehicle).

While the illustrated example shows the 3D volumetric display 104 being coupled to the vehicle 102, it will be appreciated that the 3D volumetric display 104 could be implemented as a stand-alone device. For example, the 3D volumetric display 104 may be any type of handheld device, tabletop device, vehicle-installed device, or other form of single computing device, or may be composed of multiple computing devices.

For thin surfaces, such as the window of the vehicle 102, the glass may be encapsulated in a Dewar type glass if the gas pressure is near vacuum, for example. In such an implementation, a potential shape may be limited by Beer Lambert's law, with the absorption of the composed gas being the limiting thickness of the volume.

Figure 2:
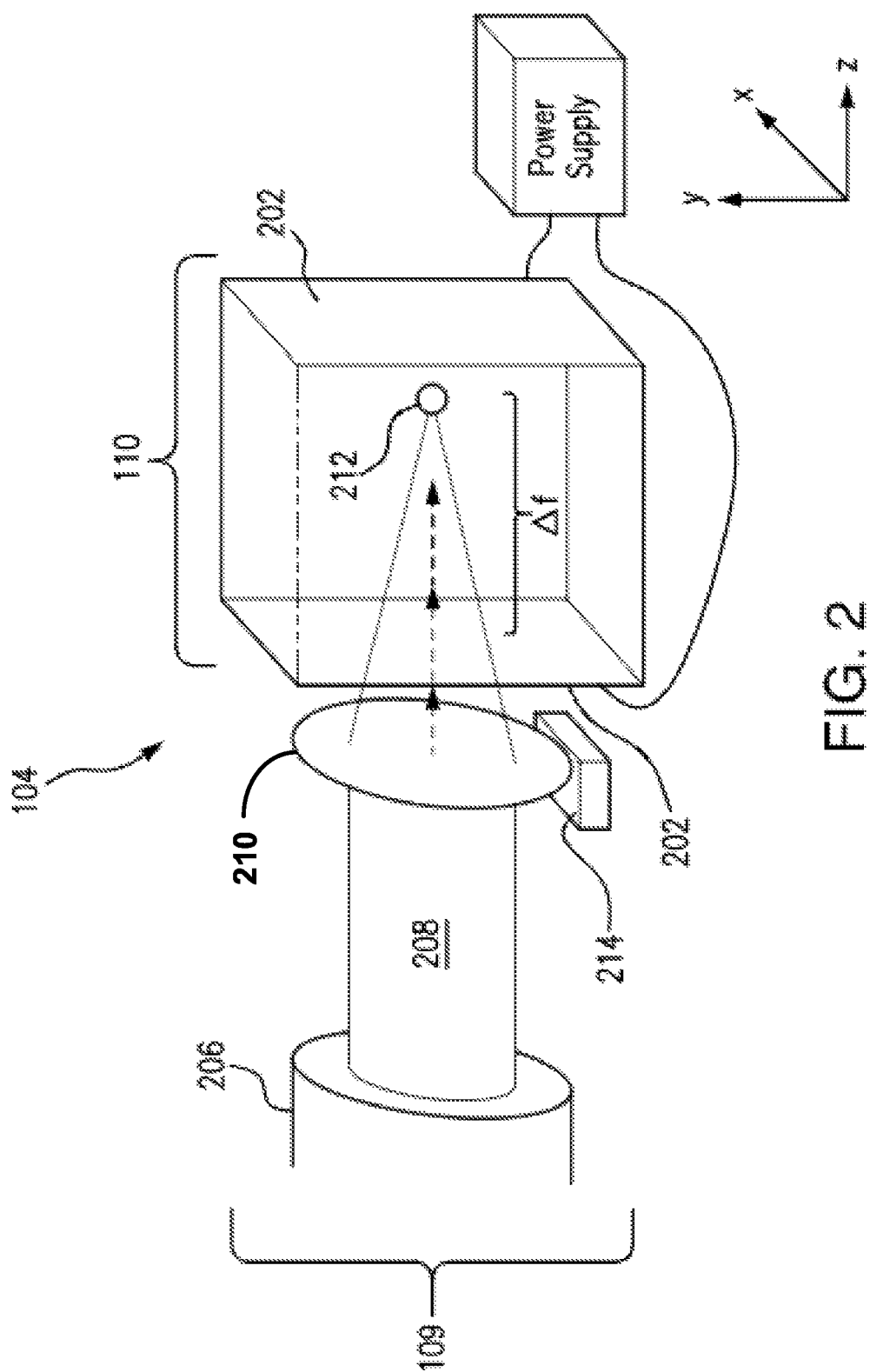
FIG. 2 is an illustrative diagram of an example 3D volumetric display according to an embodiment.

As illustrated in FIG. 2, the 3D volumetric display 104 may include the volumetric graphical display 110, illustrated here as a transparent enclosed volume, as well as the optical and mechanical equipment 109. In some implementations the transparent enclosed volume of volumetric graphical display 110 may hold a noble gas as a gain medium. In one example, helium and one or more noble gasses may be used for the gain medium.

In the illustrated implementation, the 3D volumetric display 104 may include electrodes 202 connected to a power supply 204. The electrodes 202 may be configured to apply a voltage to excite electrons of the gain medium to an excited state. For example, the electrodes 202 may include two electrodes formed as opposing plates and positioned on opposing sides of the transparent enclosed volume. The voltage may be applied to the two electrodes 202 to reach but not exceed a level that is just before the noble gas begins to glow, so as to not impact the user's visual experience.

In some implementations, electrodes 202 may be configured to apply a voltage to excite electrons of the gain medium to an excited state that includes a metastable state. For example, in implementation where the voltage is not applied or where it is applied minimally enough that two photons are still necessary to generate luminescence, then there would be a metastable state. As used herein the term "metastable state" refers to a state that acts as a temporary energy trap of a system the energy, where the trapped energy may be lost in discrete amounts. The temporary energy trap may have a longer lifetime than ordinary excited states while also having a shorter lifetime than the lowest energy state (e.g., the ground state).

In the illustrated implementation, the 3D volumetric display 104 may include a pump laser 206. The pump laser 206 may be configured to emit a laser beam 208 into the gain medium of volumetric graphical display 110. For example, the pump laser may be configured to emit a laser beam 208 at a wavelength that has an energy below an absorption line of the gain medium to allow for photon collision while also allowing the laser beam 208 to enter the gain medium. In such an implementation, light should pass through the gain medium if it is not focused, whereas focused light will collide at a much higher probability than a standard beam entering the gain medium. At the same time, the energy of the laser beam 208 should be less than the energy needed to reach the excited state, so that the light does not get absorbed by the gain medium. In this case, this implies a longer wavelength. Two photons would then add together to provide enough energy to the excited electrons to cause luminescence. As will be discussed in more detail below, the pump laser 206 may be tunable to a plurality of wavelengths.

In some examples, the pump laser 206 may be motor controlled to accesses an X/Y dimension. For example, the pump laser 206 may be motor controlled to accesses the up and down direction and in a left and right direction within the gain medium. In some implementations, the lens 210 and corresponding mirror may be placed on a single track that allows them to move together. In such an example, a motor may move the track to access the X/Y dimension.

In the illustrated implementation, the 3D volumetric display 104 may include a lens 210. The lens 210 may be configured to focus the laser beam 208 to a focused spot 212 within the transparent enclosed volume of volumetric graphical display 110.

In some examples, the lens 210 may be a controlled variable focal lens. For example, the lens 210 may be controlled to accesses a Z dimension via a polymer and electrical actuator, a motor, the like, and/or combinations thereof. Accordingly, the lens 210 may be configured to move the focused spot 212 at various depths within the gain medium. For example, a motor 214 may be used to control the rotational stage of the lens 210 to move the focused spot 212.

Accordingly, in conjunction, the pump laser 206 and lens 210 may be motor controlled to move the focused spot 212 to accesses a X/Y/Z dimension. For example, the pump laser 206 and lens 210 may move the focused spot 212 at various depths as well as in an up and down direction and in a left and right direction within the gain medium as a three-dimensionally scanned voxel to produce a 3D image.

The pump laser 206 may be used to pump the gain medium of volumetric graphical display 110 and cause luminescence. For example, such luminescence may be achieve by two-photon excitation. As described above, when atoms are exposed to a voltage, this has the potential to excite the atoms. In this excited state, it may be possible to secondarily excite the atoms with the pump laser 206. Such laser excitation may not need to operate at exactly double the wavelength of the emitted light. Therefore in this case, two-photon luminescence may or may not still be necessary. For example, in implementation where the voltage applied was enough to excite the electrons to a state equivalent to half the luminescence energy, two-photon luminescence may still be necessary.

The gain medium with excited electrons is configured to receive the laser beam 208 having a pumped wavelength at a first wavelength. In response, the gain medium may be configured to emit a second wavelength that is half of the first wavelength in response to excitation from the pump laser 206. In some embodiments, the pump laser 206 may be tunable to a plurality of non-visible pumping wavelengths so that a user will not perceive the laser beam 208 entering the gain medium. Different pumping wavelengths may be used to create different wavelengths of illumination (e.g., red, green, yellow, and blue, as well as other colors) visible to a user as a result of the excitation from the pump laser 206. For example, laser 206 may include a femtosecond laser to pump the gain medium and cause luminescence.

Different pumping wavelengths may be used to create different wavelengths of illumination (e.g., red, green, yellow, and blue, as well as other colors). In some implementations, the colors generated are not limited to red, green and blue. For example, multiple lasers could be individually used to generate different colors. By accessing different specific atomic states, colors other than red, green and blue may be generated.

In some implementations, a blue-type second wavelength of between 450 nanometers and 495 nanometers may be emitted in response to a pumped first wavelength of between 900 nanometers and 990 nanometers, a green-type second wavelength of between 495 nanometers and 570 nanometers may be emitted in response to a pumped first wavelength of between 990 nanometers and 1140 nanometers, and a red-type second wavelength of between 620 nanometers and 750 nanometers may be emitted in response to a pumped first wavelength of between 1240 nanometers and 1500 nanometers.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Figure 3:
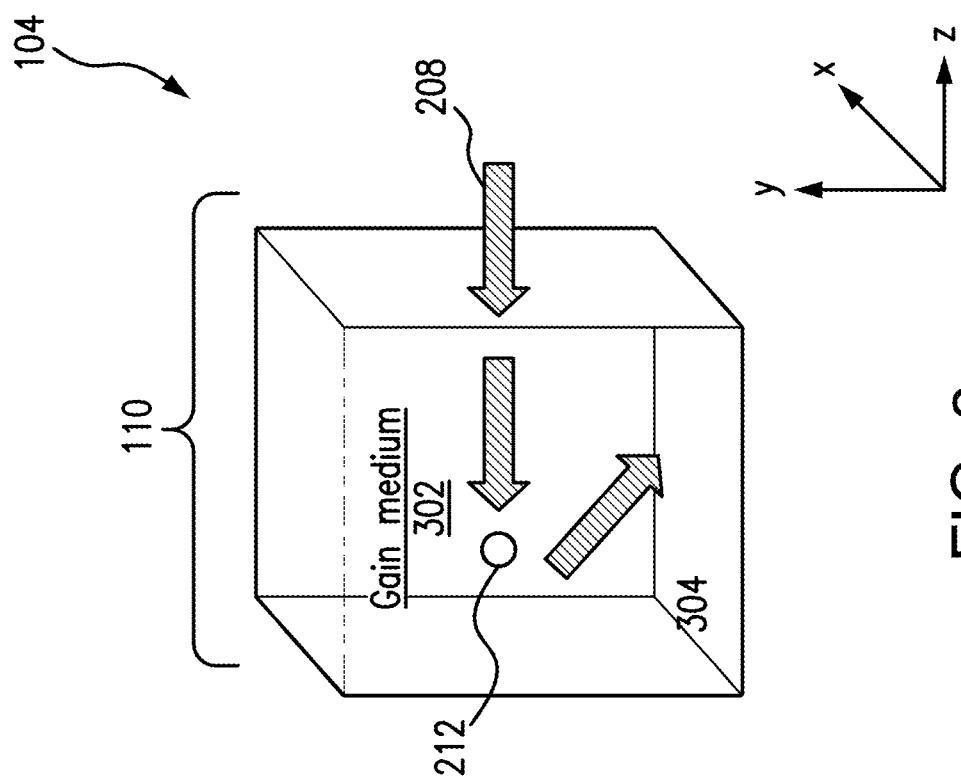
FIG. 3 is another illustrative diagram of an example 3D volumetric display in operation according to an exemplary embodiment.

As illustrated in FIG. 3, the laser beam 208 may be pumped at a wavelength that has an energy below an absorption line of the gain medium 302. Such operation may allow the laser beam to enter the gain medium 302. The laser beam 208 will be absorbed at an edge of the gain medium (e.g., the laser beam 208 will not enter the internal portion of the volume) if pumped at a wavelength that is within the absorption line of the gain medium 302, and would instead be absorbed at the surface of volumetric graphical display 110.

The laser beam 208 may be focused to allow for photon collision within the gain medium 302 at the focused spot 212. This is significant as no emission may occur when the laser beam 208 is not focused within the gain medium 302. Instead, an unfocussed laser beam 208 may pass all through the gain medium 302.

Figure 4:
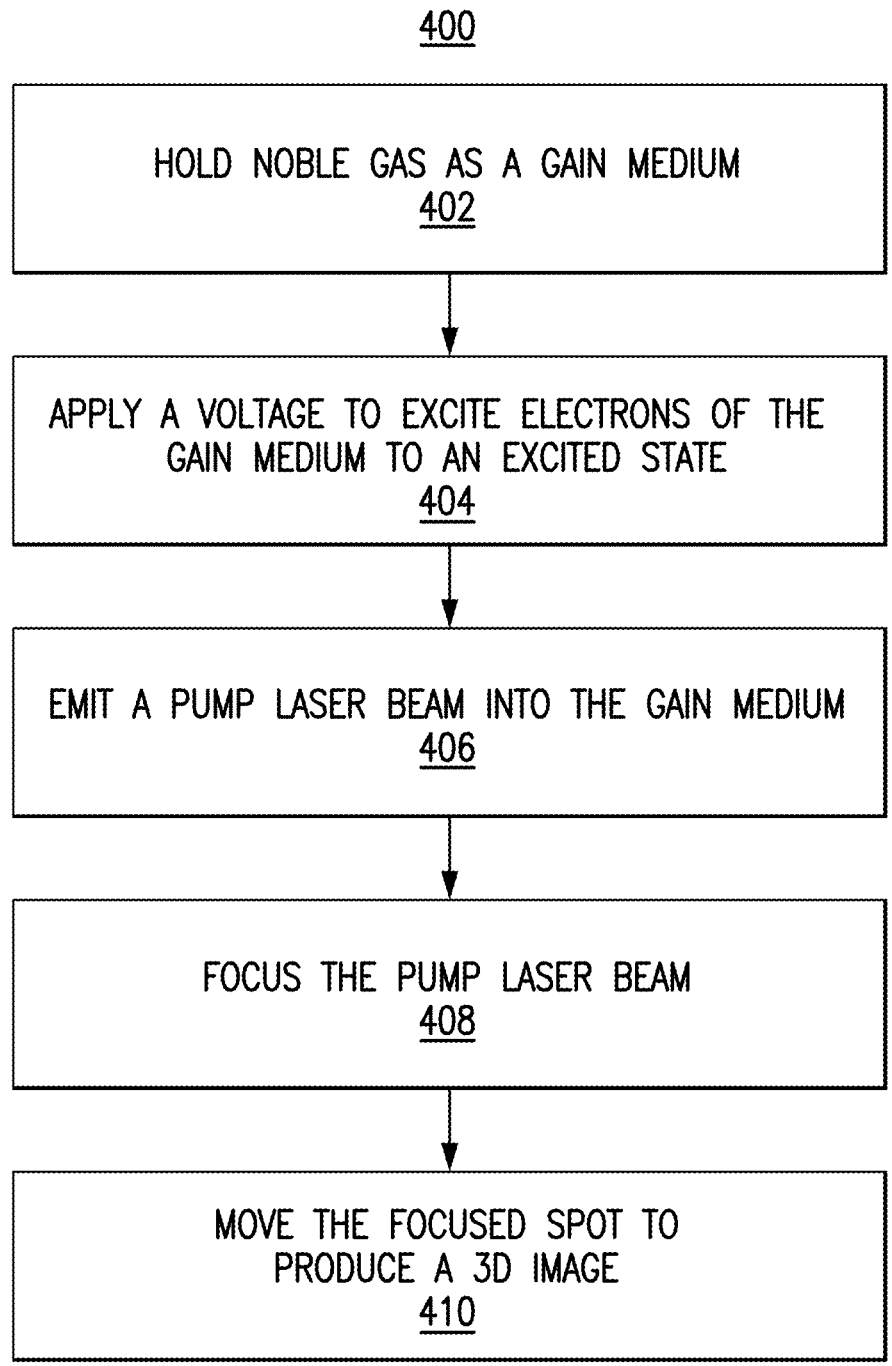
FIG. 4 is a flowchart of an example of a method of operating a 3D volumetric display according to an embodiment.

FIG. 4 shows a method 400 of operating the 3D volumetric display 104. In an embodiment, the method 400 may be implemented in logic instructions (e.g., software), configurable logic, fixed-functionality hardware logic, etc., or any combination thereof. While certain portions of 3D volumetric display 104 are illustrated in method 400, other portions of 3D volumetric display 104 from FIG. 1 have been intentionally left out to simplify the explanation of the method.

At illustrated processing operation 402, a noble gas may be held as a gain medium. For example, a noble gas may be held as a gain medium within a transparent enclosed volume.

At illustrated processing operation 404, a voltage may be applied to excite electrons of the gain medium. For example, a voltage may be applied to excite electrons of the gain medium via two electrodes positioned on opposing sides of the transparent enclosed volume. In some implementations, the electrodes may be set to a specific driving voltage at a level that is just before the noble gas begins to glow. In some examples, a voltage may be applied to excite electrons of the gain medium to an excited state that includes a metastable state.

At illustrated processing operation 406, a laser beam may be emitted into the gain medium. For example, a laser beam may be emitted into the gain medium, via a pump laser, at a wavelength that has an energy below an absorption line of the gain medium to allow for photon collision while also allowing the laser beam to enter the gain medium.

At illustrated processing operation 408, the laser beam may be focused. For example, the laser beam may be focused, via a lens, to a focused spot within the transparent enclosed volume.

At illustrated processing operation 410, the focused spot may be moved to produce a 3D image. For example, the focused spot may be moved to produce a 3D image, where the lens is configured to move the focused spot at various depths while the pump laser is configured to move the focused spot in an up and down direction and in a left and right direction within the gain medium as a three-dimensionally scanned voxel to produce a 3D image.

In operation, the gain medium with excited electrons may receive the laser beam having a pumped wavelength at a first wavelength and emits a second wavelength that is half of the first wavelength in response to excitation from the pump laser. Display information may be passed to the lasers, in the appropriate infrared wavelength, to give the desired corresponding red, green, blue (RGB) values.

Advantageously, the enclosed volume may hold the electrically excited noble gas as the gain medium without the use of suspended particles. For example, suspended particles, such as suspended fluorophore particles, may often be toxic. Accordingly, eliminating the need for such suspended particles, through the use of electrically excited noble gas, may be advantageous.

Advantageously, electrodes may be utilized to excite electrons of a noble gas gain medium to an excited state. In some examples, a voltage may be applied to excite electrons of the gain medium to an excited state that includes a metastable state. For example, such electrical excitation may avoid the use of heat to excite the electrons via Doppler broadening. Accordingly, in some implementations, no heat is applied to excite electrons of the gain medium to the excited state.

Advantageously, in some implementations, it is possible to use only a single laser to generate luminescence from the noble gas gain medium. The single laser may be focused to a tight spot. In implementations described herein using contained noble gas that is electrically excited, the focusing may allow for the photons to collide to result in luminescence. Such implementations may remove the need to have a second laser for excitation resulting in luminescence. While implementations are described as only using a single laser to generate luminescence, it will be appreciated that multiple lasers may be used. For example multiple lasers could each be individually used to generate different colors. Additionally or alternatively multiple lasers could each be individually used to increase rendering speed.

Figure 5:
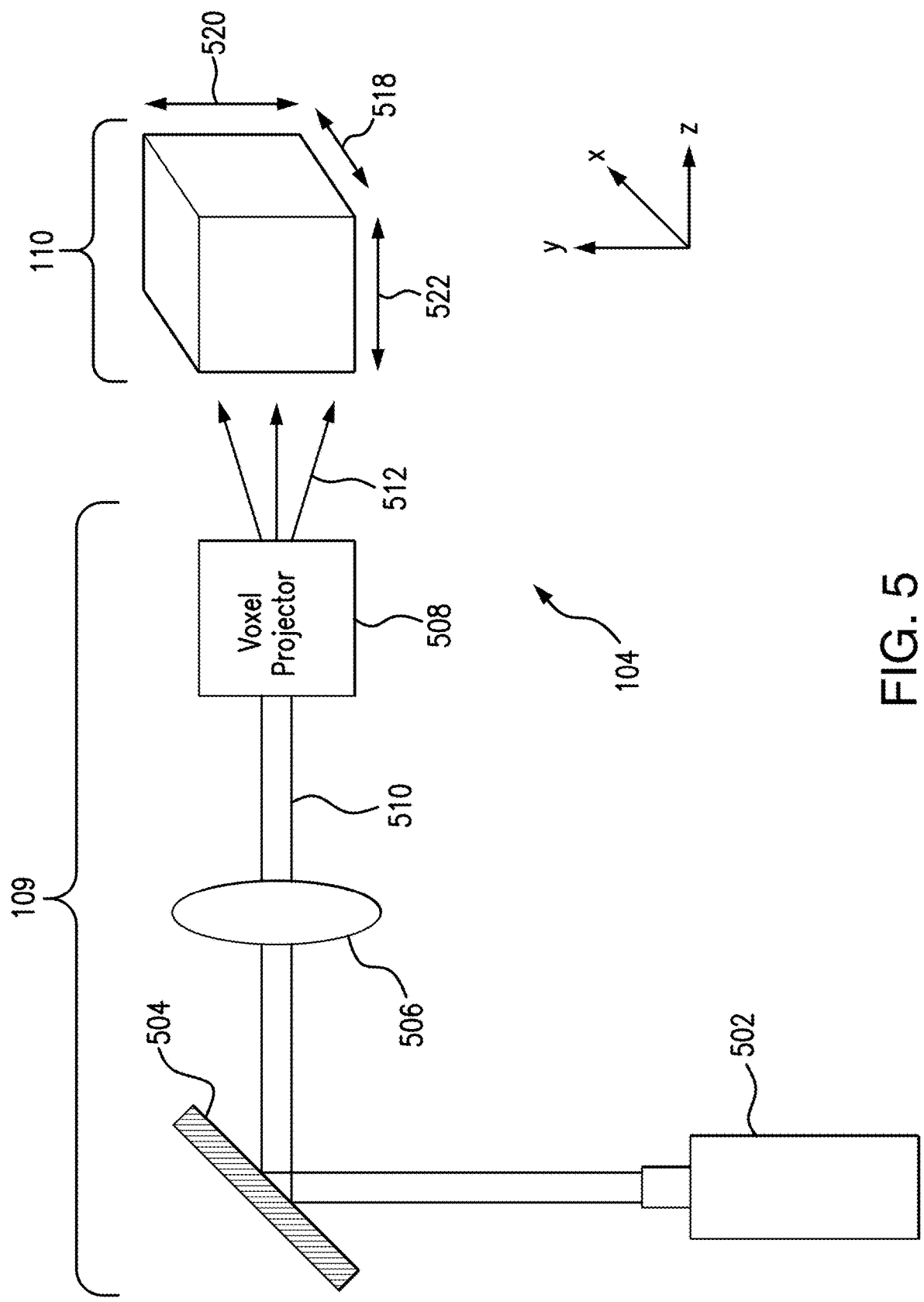
FIG. 5 is an illustrative diagram of an example 3D volumetric display according to an embodiment.

As illustrated in FIG. 5, the 3D volumetric display 104 may include the volumetric graphical display 110, illustrated here as a transparent enclosed volume, as well as the optical and mechanical equipment 109. In some implementations the transparent enclosed volume of volumetric graphical display 110 may hold a gas as a stationary gain medium. In one example, the gas may include noble gasses, helium, and/or combinations thereof.

In the illustrated implementation, the 3D volumetric display 104 may include a light source 502. The light source may be 502 may be configured to emit a light beam 510. For example, light source 502 may be a laser configured to emit a pumped laser beam. In such an example, the pump laser may be tunable to a plurality of wavelengths. Different laser wavelengths may be used to create different wavelengths of illumination (e.g., red, green, yellow, and blue, as well as other colors). For example, different pumping wavelengths may be used to create different wavelengths of illumination (e.g., red, green, yellow, and blue, as well as other colors) visible to a user as a result of luminescence, although other luminescence mechanisms may be utilized with the 3D volumetric display 104 disclosed herein. For example, such luminescence may be achieve by two-photon excitation. In one example, light source 502 may include a femtosecond laser to pump the gain medium and cause luminescence.

In some examples, the 3D volumetric display 104 may include a scanning mirror 504. The scanning mirror 504 may be configured to direct the light beam 510 from the light source 502. For example, a motor may be used to control the positioning of the scanning mirror 504 to adjust the light beam 510 in the X and/or Y dimensions, e.g., in a horizontal dimension 518 and/or vertical dimension 520 with respect to a voxel projector 508, as will be described in more detail below.

In some examples, the 3D volumetric display 104 may include a lens 506. The lens 506 may be located between the scanning mirror 504 and the voxel projector 508. The lens 506 may be configured to focus the light beam 510 to a tightly focused spot. In some implementations, lens 506 may be a variable focal length lens located between the scanning mirror 504 and the voxel projector 508 to adjust the light beam 510, and thus expanded beam 512, in a Z-direction, e.g., in a longitudinal dimension 522 into and out of the stationary gain medium within the volumetric graphical display 110. For example, a motor the rotational stage of the lens 506 may be controlled to adjust the light beam 510 in the Z-direction via a polymer and electrical actuator, a motor, the like, and/or combinations thereof.

Alternatively, lens 506 may include two or more lenses configured to adjust the light beam 510 in the Z-direction. For example, the two or more lenses may be stacked in the Z-direction and selectively actuated on a lens-by-lens basis to adjust the light beam 510 in the Z-direction, e.g., into and out of the stationary gain medium within the volumetric graphical display 110.

In the illustrated implementation, the 3D volumetric display 104 may include a voxel projector 508. The voxel projector may be configured to receive the light beam 510 from the scanning mirror 504 and may be configured to project an expanded beam 512 into the stationary gain medium within the volumetric graphical display 110.

The expanded beam may be expanded in an X and/or Y dimension, e.g., in a horizontal and/or vertical dimension. For example, changes in the X and/or Y orientation between the light beam 510 from the scanning mirror 504 and the voxel projector 508 may result in relatively larger changes in the X and Y dimension of the expanded beam 510 that is projected into the stationary gain medium within the volumetric graphical display 110 to produce a 3D image. Accordingly, a change in the orientation of the scanning mirror 504 to direct the light beam 510 from the light source 502 covers a first area in the X and Y dimension of the volumetric graphical display 110 when not modified by the voxel projector 510 and covers a second larger area in the X and Y dimension of the volumetric graphical display 110 when modified by the voxel projector 510.

As will be discussed in more detail below, the voxel projector 508 may be used to permit the scanning mirror 504 to cover more of the volume of the 3D volumetric display 104 through several different implementations disclosed herein.

In one implementation, a stationary grating structure-type voxel projector 508 may be configured to manipulate the light beam 510 by magnifying and/or projecting the light beam 510 into a larger area in the volume of the 3D volumetric display 104. The stationary grating structure-type voxel projector 508 may allow small changes in the X and/or Y dimensions by the scanning mirror 504 to cause larger changes in the X and/or Y dimensions in the volume of the 3D volumetric display 104.

In another implementation, a stationary metasurface structure-type voxel projector 508 may be configured to manipulate the light beam 510 by magnifying and/or projecting the light beam 510 into a larger area in the volume of the 3D volumetric display 104. The stationary metasurface structure-type voxel projector 508 may allow small changes in the X and/or Y dimensions by the scanning mirror 504 to cause larger changes in the X and/or Y dimensions in the volume of the 3D volumetric display 104.

In a further implementation, a rotatable diffractive plate-type voxel projector 508 may be rotated to shift the light beam 510 in an X dimension within the volume of the 3D volumetric display 104. Then the light beam may be adjusted in the Y dimension within the volume by moving the light beam radially on the diffractive plate-type voxel projector. The rotatable diffractive plate-type voxel projector 508 may allow small changes in the X and/or Y dimensions in the rotational and radial position to cause larger changes in the X and/or Y dimensions in the volume of the 3D volumetric display 104.

Figure 6A:
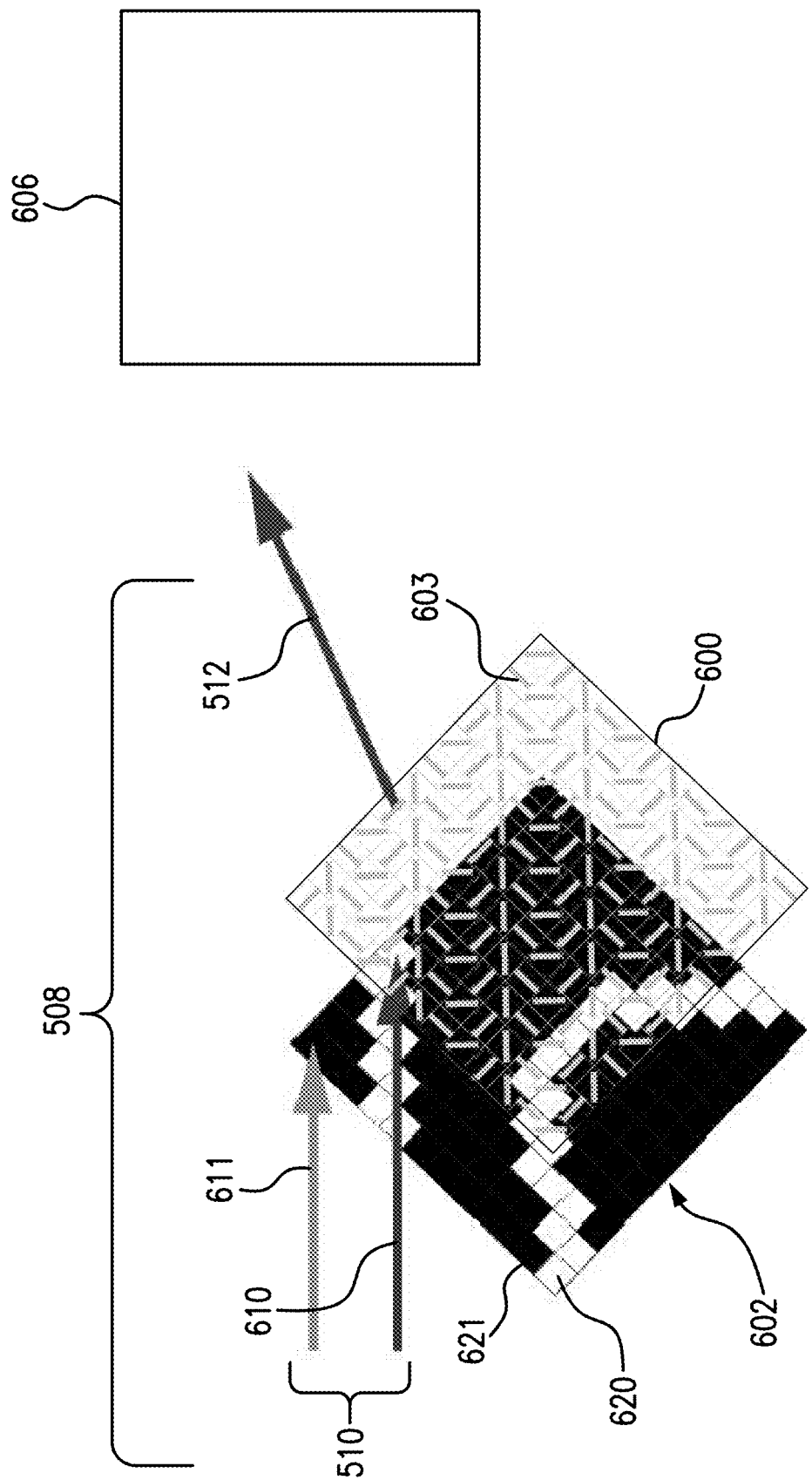
FIG. 6A is an illustrative diagram of a stationary grating structure according to an embodiment.

As illustrated in FIG. 6A, the voxel projector 508 may be implemented as a grating structure 600. The grating structure 600 may permit the expanded beam 512 to cover more of the volume of a slice 606 of a 3D image. For example, the scaling of the image from a smaller planar dimension to a larger planar dimension increases the dimension of the accessible beam region of slice 606.

In such an implementation, grating structure 600 may be used in combination with a liquid crystal 602. The role of the grating structure 600 is to increase the dimension of the accessible beam region of slice 606. The role of the liquid crystal 302 is to choose which pixel should be illuminated. For example, liquid crystal 602 allows an optical beam portion 610 to pass through a clear portion 620 of liquid crystal 602. Likewise, liquid crystal 602 blocks an optical beam portion 611 from passing through a darkened portion 621 of liquid crystal 602.

In the illustrated implementation, the voxel projector 508 implemented as the grating structure 600 may be stationary. Accordingly, orientation changes by the scanning mirror (e.g., see FIG. 2) may control the relatively larger changes in the X and Y dimension of the expanded beam 512 that is projected into the volume of the stationary gain medium.

The grating structure 600 may include a surface structure pattern 603. An individual part of the surface structure pattern 603 may be at a scale larger than a wavelength of the light beam. Such a grating structure 600 may be a Dammann-type grating, or the like.

As used herein the term "grating" may refer to indents in a plane, where the indents correspond to specific angles of refraction based on wavelength of light incident on the indents (e.g., as individual part of the surface structure pattern 603). For example, the indents in such a grating are at a scale larger than the wavelength of light. In some examples, the suitable size of the indents in such a grating may be dependent on the wavelength of light utilized. In an example where the light used has a one micron wavelength, the indents in such a grating may be larger than one micron, and/or a similar size, for example (e.g., an individual surface structure pattern within the grating structure may be at a micron scale of between 1-10 microns). Typically, gratings may provide diffracted of light expansion access mostly limited to an expansion in one dimension, e.g., horizontal or vertical.

In the illustrated implementation, the voxel projector 508 implemented as the grating structure 600 may be stationary. Accordingly, orientation changes by the scanning mirror (e.g., see FIG. 5) may control the relatively larger changes in the X and Y dimension of the expanded beam 512 that is projected into the volume of the stationary gain medium.

In operation, a plurality of voxel projectors 508 implemented as grating structures 600 may be utilized. For example, for red-green-blue-type systems, a single red optical beam may be associated with a first grating structure 600, a single blue optical beam may be associated with a second grating structure 600, and a single blue optical beam may be associated with a third grating structures 600.

Figure 6B:
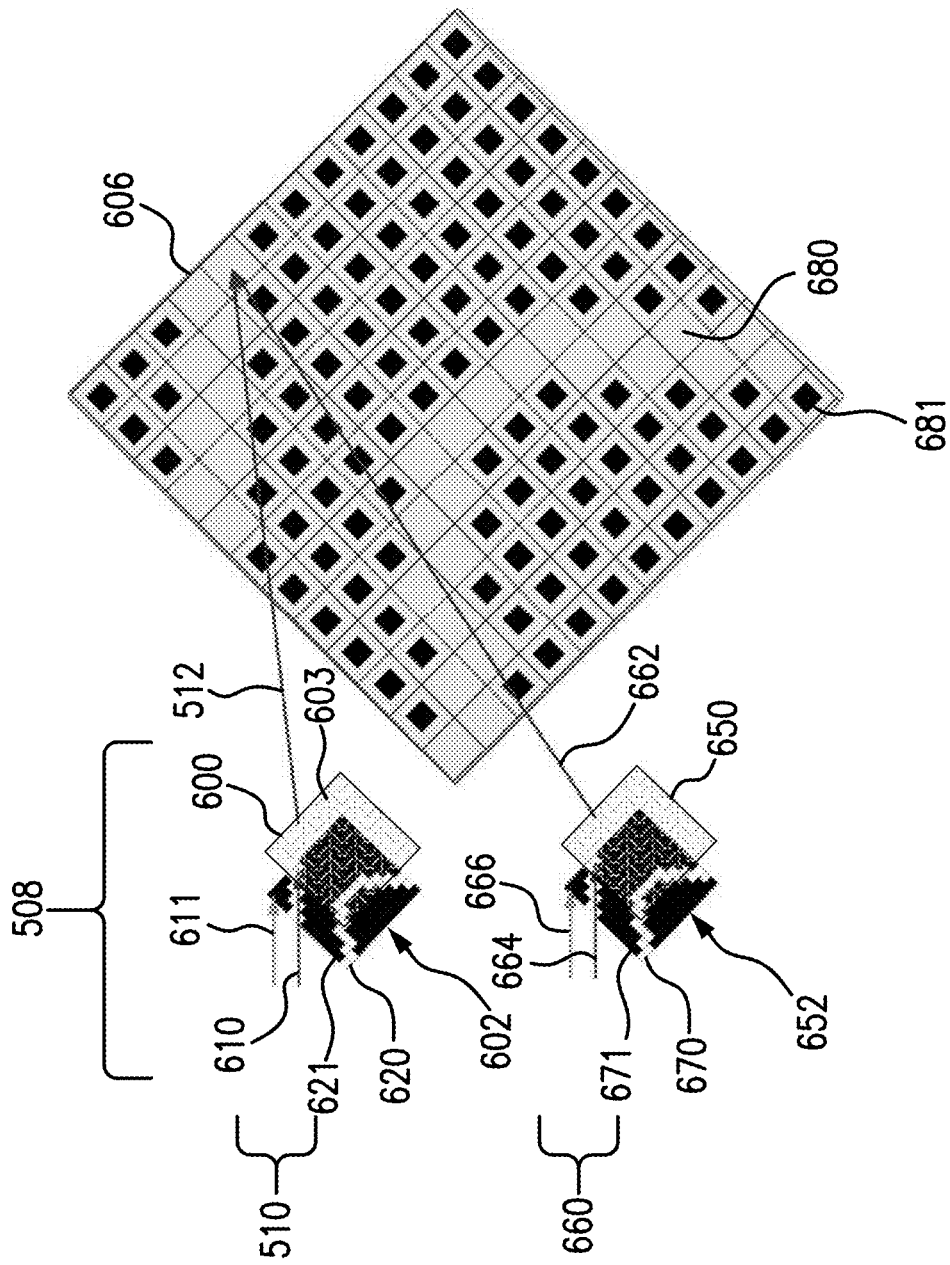
FIG. 6B is another illustrative diagram of a stationary grating structure according to an embodiment.

As illustrated in FIG. 6B, another illustrative diagram of a stationary grating structure 600 according to an embodiment the voxel projector 508 may be implemented to accommodate two optical beams being used in conjunction. For example, two optical beams may be used in conjunction to generate two-photon luminescence to illuminate a given voxel in 3D space. In such an implementation, each pair of optical beams may be associated with a corresponding pair of grating structures 600.

For example, a first optical beam 510 may be associated with a first grating structure 600 and a second optical beam 660 may be associated with a second grating structure 650. The grating structures 600 and 650 may permit the expanded beam 512 and 662 to cover more of the volume of a slice 606 of a 3D image.

In such an implementation, second grating structure 650 may be used in combination with a second liquid crystal 652. The role of the second grating structure 650 is to increase the dimension of the accessible beam region of slice 606. The role of the second liquid crystal 652 is to choose which pixel should be illuminated. For example, the second liquid crystal 652 allows an optical beam portion 666 to pass through a clear portion 370 of the second liquid crystal 652. Likewise, the second liquid crystal 652 blocks an optical beam portion 666 from passing through a darkened portion 621 of the second liquid crystal 652. For example, the expanded beams 512 and 662 may illuminate voxel pattern 680 while darkening voxel pattern 681.

Figure 7:
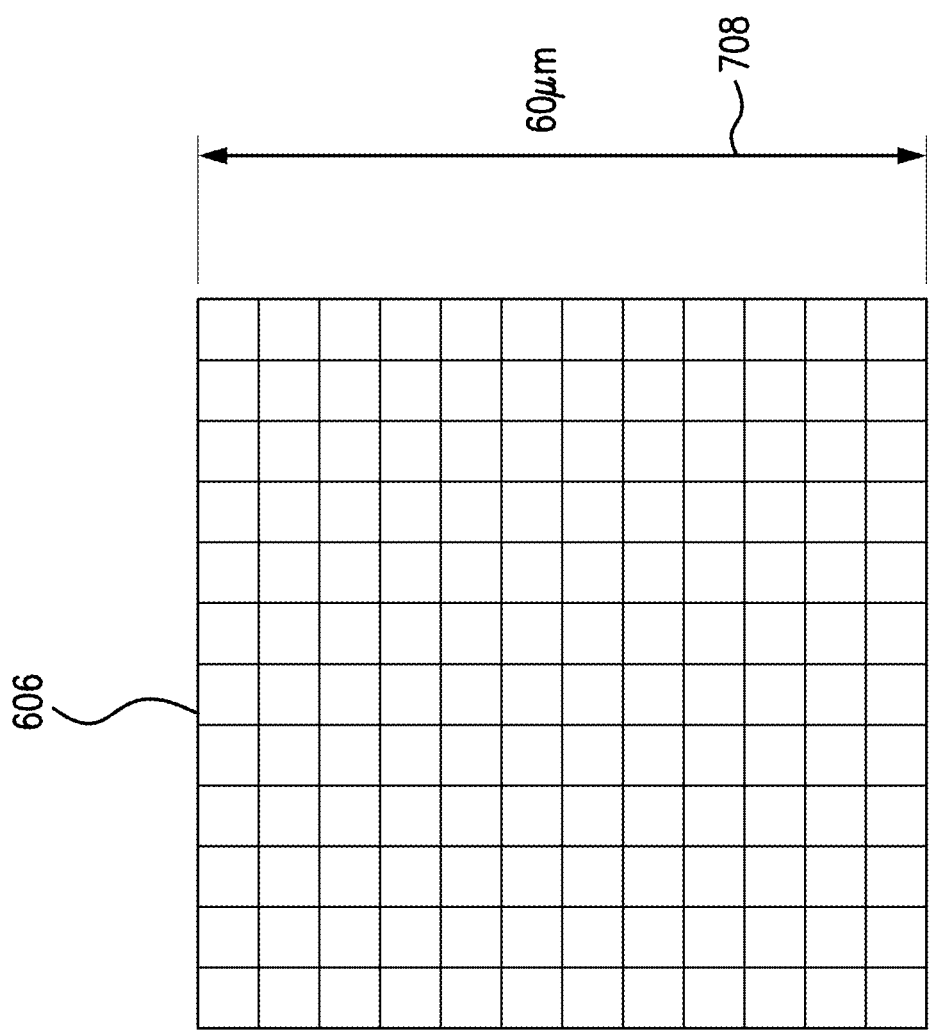
FIG. 7 is an illustrative diagram of a stationary metasurface structure according to an embodiment.
Figure 7:
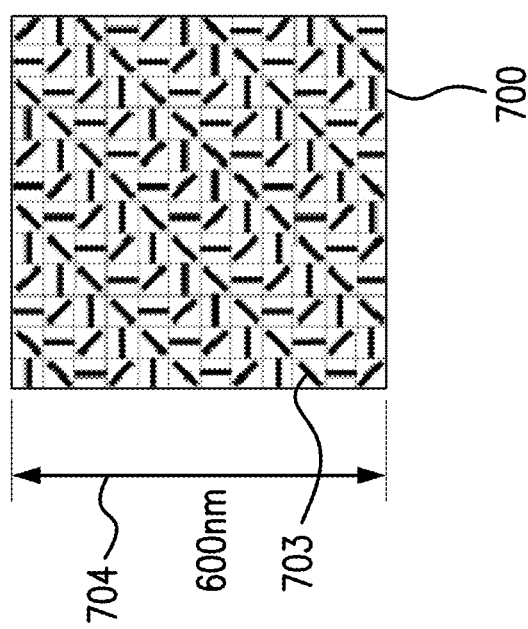

As illustrated in FIG. 7, the voxel projector 508 may be implemented as a metasurface structure 700. The metasurface structure 600 may permit the expanded beam to cover more of the volume of a slice of a 3D image.

For example, such a metasurface structure 700 may include a surface structure pattern 703. An individual part of the surface structure pattern 703 within the metasurface structure 700 may be at a scale smaller than a wavelength of the light beam.

As used herein the term "metasurface" may refer to microscopic surface structure pattern in a plane, where the microscopic surface structures correspond to specific angles of refraction based on wavelength of light incident on the microscopic surface structures (e.g., as an individual part of the surface structure pattern 703). For example, the microscopic surface structures in such a metasurface may be at a scale smaller than the wavelength of light. In some examples, the suitable size of the microscopic surface structures in such a metasurface may be dependent on the wavelength of light utilized. In an example where the light used has a one micron wavelength, the microscopic surface structures in such a metasurface may be at a nanoscale, e.g., smaller than one micron, such as three hundred nanometers, two hundred nanometers, and/or a similar size, for example (e.g., an individual surface structure pattern within the metasurface structure is at a scale of between 100-900 nanometers).

FIG. 7 illustrates the relative aspect ratio of the accessible region 606 in 2D space as compared to the overall 2D space of the metasurface structure 700. In the illustrated example, a metasurface of 600 nanometers (e.g., as illustrated at item 704) may increases the dimension of the accessible beam region of slice 606 to 60 microns (e.g., as illustrated at item 708). Typically, metasurfaces may provide diffracted of light expansion access to an expansion in two dimensions, e.g., horizontal and vertical, and provide control over the light's phase and amplitude.

Additionally, even though an optical beam may illuminate a small voxel region, the visibly effective pixel size can be larger. For example, the effective pixel size will vary depending on the radiative pattern of the emissive material. For more emissive materials, a given illuminated voxel region may result in a larger visibly effective pixel size, as compared to operations with a less emissive material.

In some implementations, the voxel projector 508 implemented as the metasurface structure 700 may be stationary. Accordingly, orientation changes by the scanning mirror (e.g., see FIG. 5) may control the relatively larger changes in the X and Y dimension of the expanded beam (e.g., see FIG. 2) that is projected into the volume of the stationary gain medium.

In operation, a plurality of voxel projectors 508 implemented as metasurface structures 700 may be utilized. For example, for red-green-blue-type systems, a single red optical beam may be associated with a first metasurface structure 700, a single blue optical beam may be associated with a second metasurface structure 700, and a single blue optical beam may be associated with a third metasurface structure 700.

Alternatively, as discussed above, some systems may utilize pairs of optical beams in conjunction to generate two-photon luminescence to illuminate a given voxel in 3D space. In such an implementation, each pair of optical beams may be associated with a corresponding pair of metasurface structures 700.

Figure 8:
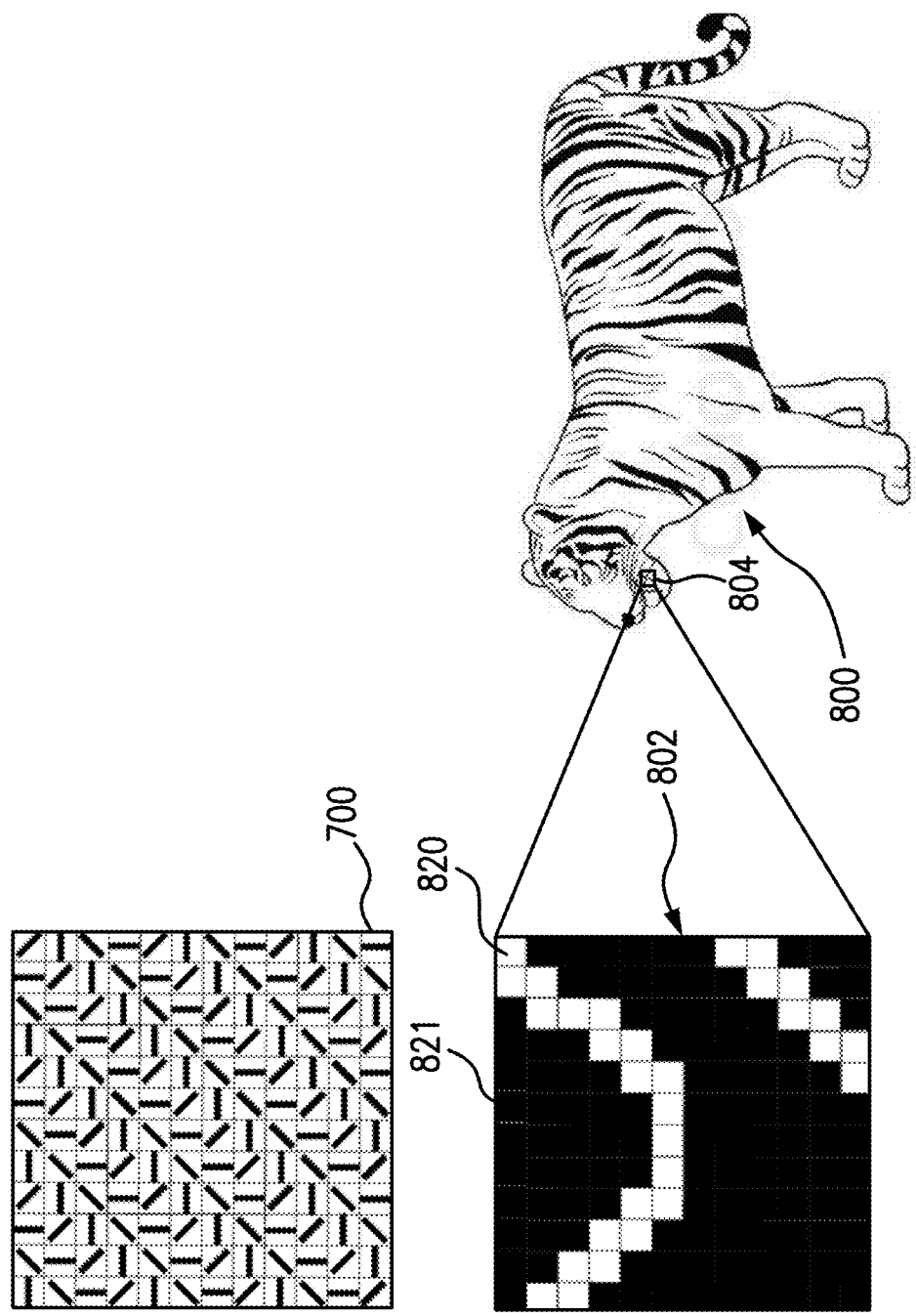
FIG. 8 is another illustrative diagram of another example stationary metasurface structure according to an embodiment.

As illustrated in FIG. 8 metasurface structure 700 may be utilized in a manner similar to grating structure 300 to generate an image 800. In the illustrated example, a liquid crystal back plane 802 may modify the region of illuminated-interest. In such an implementation, metasurface structure 700 may be used in combination with liquid crystal back plane 802. The role of the metasurface structure 700 is to increase the dimension of the accessible beam region of a slice of image 800. The role of the liquid crystal back plane 802 is to choose which pixel should be illuminated within image portion 804. For example, liquid crystal back plane 802 allows an optical beam to pass through a clear portion 820 of liquid crystal back plane 802. Likewise, liquid crystal 802 blocks an optical beam from passing through a darkened portion 821 of liquid crystal back plane 802.

Figure 9:
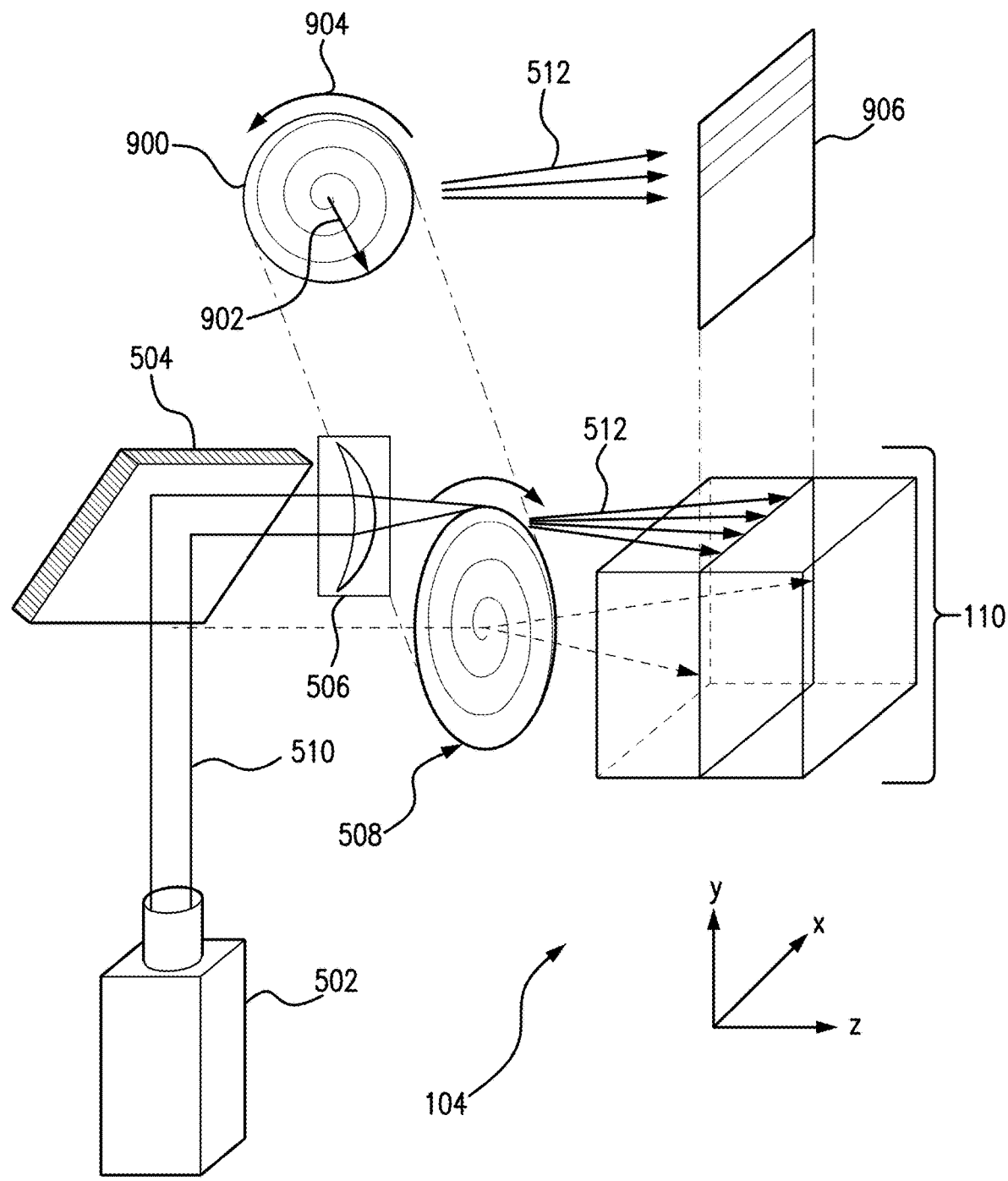
FIG. 9 is an illustrative diagram of another example 3D volumetric display in operation with a rotatable diffractive plate according to an exemplary embodiment.

As illustrated in FIG. 9, the voxel projector 508 may be a rotatable diffractive plate 900. For example, a radial location 902 of the light beam 508 on the rotatable diffractive plate 800 and rotational orientation 904 of the rotatable diffractive plate 900 may be used to control the relatively larger changes in the X and Y dimension of the expanded beam that is projected into the volume of the stationary gain medium. The rotatable diffractive plate 900 may permit the expanded beam 512 to cover more of the volume of a slice 906 of a 3D image.

In such an implementation, specific locations on the rotatable diffractive plate 800 will correspond to specific locations on an XY coordinate plane. For example, a series of these specific locations may be oriented as a spiral, or similar functional orientation, on the rotatable diffractive plate 900. These specific locations on the rotatable diffractive plate 800 may be similar to memory on a Compact Disc (CD). Accordingly, the resolution of the coordinate plane may be defined by the specific locations on the rotatable diffractive plate 900, e.g., by the "memory" of the disc.

Advantageously, the relatively larger changes in the X and Y dimension of the expanded beam 512 that is projected into the volume of the stationary gain medium causes changes in the X and Y dimensions of sufficient size to speed up raster scanning of voxels to obtain a resolution of one thousand and twenty-four pixels over a thirty centimeter display area. Similar results may be obtainable from the implementations illustrated in FIGS. 6A-8.

Figure 10:
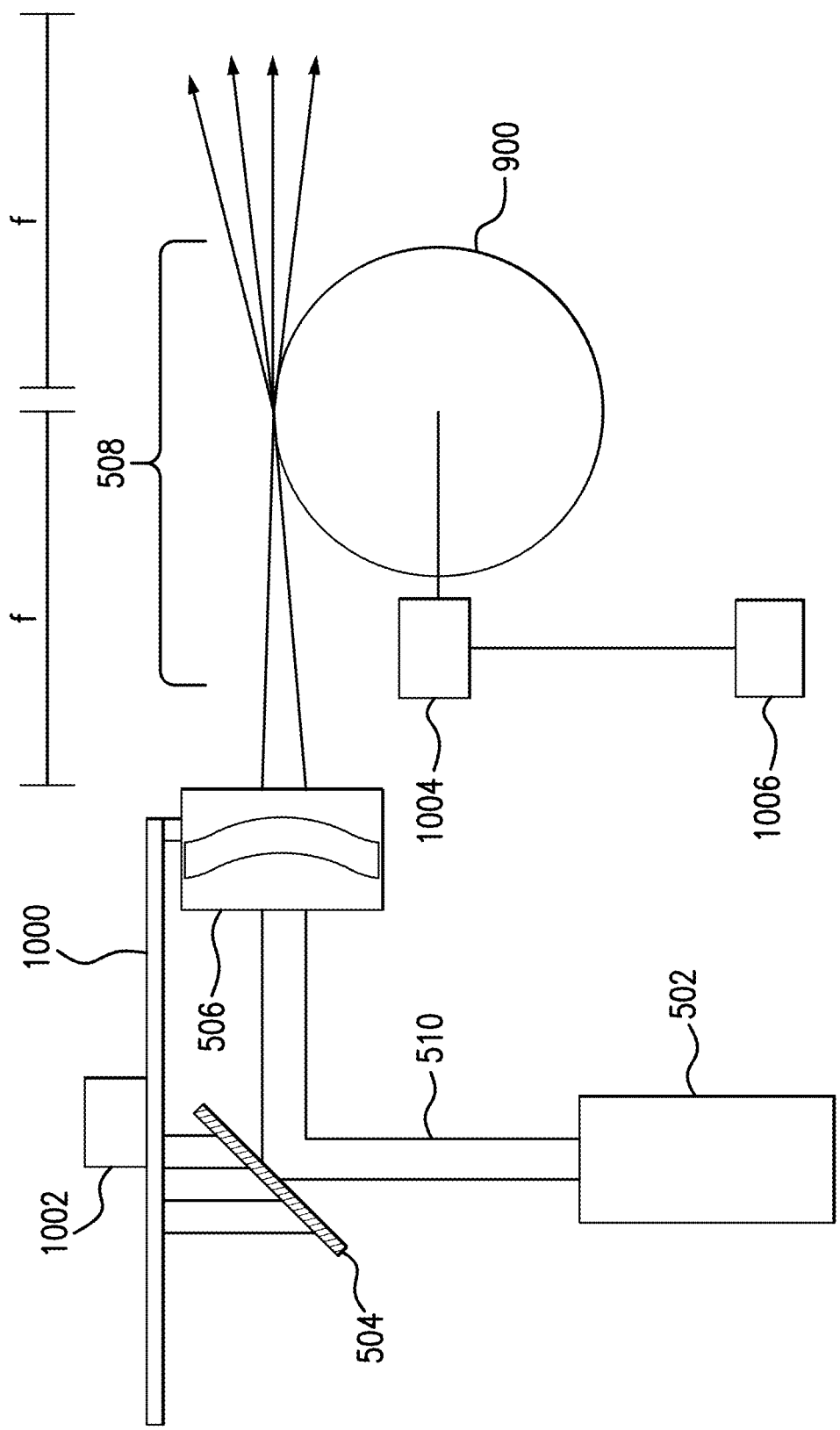
FIG. 10 is another illustrative diagram of an example bracket for a 3D volumetric display according to an exemplary embodiment.
Figure 11:
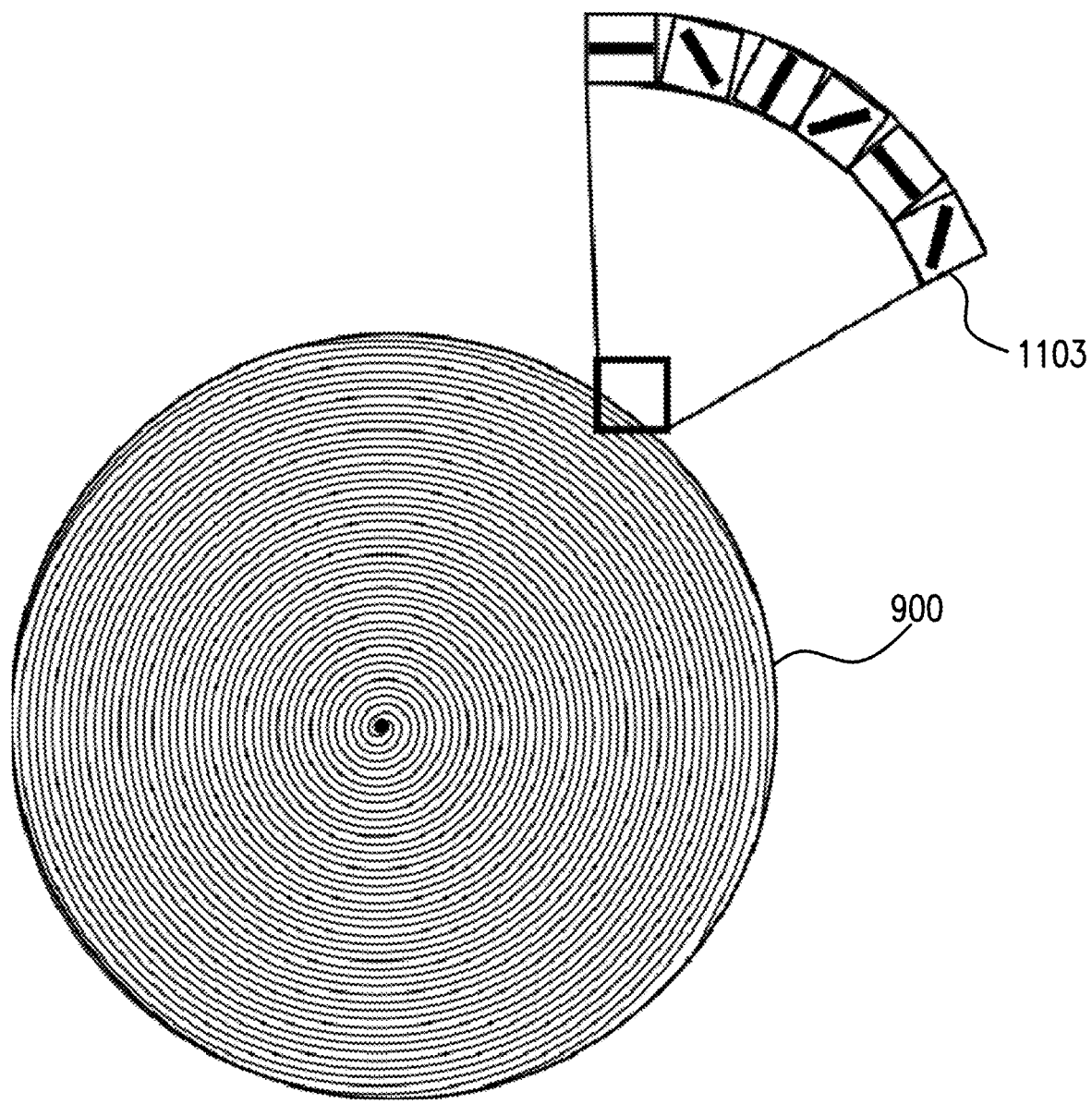
FIG. 11 is an illustrative diagram of rotatable diffractive plate in operation according to an exemplary embodiment.

As illustrated in FIG. 10, the lens 506 may be positioned close enough to the spinnable diffractive plate 900 to remove any possible angle of photons. In such an implementation, a bracket 1000 may be coupled to the lens 506 and scanning mirror 504. The bracket 1000 may be configured to maintain the placement of the lens 506 with respect to the spinnable diffractive plate 900 to remove any possible angle of photons.

A first motor 1002 may be operatively associated with the mirror 504 and variable focal length lens 506. For example, the first motor 1002 may be attached to the mirror 504 and variable focal length lens 506 via the bracket 1000 to control the placement of the lens 506 with respect to the spinnable diffractive plate 600.

A second motor 1004 may be operatively associated with the spinnable diffractive plate 600. The second motor 1004 may control the spin of the spinnable diffractive plate 900.

A third motor 1006 may be operatively associated with the spinnable diffractive plate 600. The second motor 1004 may control movement the linear movement of the spinnable diffractive plate 900.

As with some of the other implementations described herein, a plurality of the voxel projectors 508 with rotatable diffractive plates 900 could be used at the same time in a single 3D volumetric display.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. The term "coupled" may be used herein to refer to any type of relationship, direct or indirect, between the components in question, and may apply to electrical, mechanical, fluid, optical, electromagnetic, electromechanical or other connections. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components. In addition, the terms "first", "second", etc. may be used herein only to facilitate discussion, and carry no particular temporal or chronological significance unless otherwise indicated.

As used herein, the term "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. An apparatus for 3D volumetric display, comprising:
a transparent enclosed volume to hold a noble gas as a gain medium;
two electrodes, positioned on opposing sides of the transparent enclosed volume, to apply a voltage to excite electrons of the gain medium to an excited state;
a single pump laser, configured to emit a laser beam into the gain medium at a wavelength that has an energy below an absorption line of the gain medium, to allow for photon collision while also allowing the laser beam to enter the gain medium; and
a lens configured to focus the laser beam to a focused spot within the transparent enclosed volume, wherein the lens is configured to move the focused spot at various depths, and the single pump laser is configured to move the focused spot in an X dimension and a Y dimension, wherein the lens and single pump laser operate together to move the focused spot within the gain medium as a three-dimensionally scanned voxel to produce a 3D image,
wherein the gain medium with excited electrons is configured to receive the laser beam having a pumped wavelength at a first wavelength and configured to emit a second wavelength that is one-half of the first wavelength as luminescence, wherein the luminescence is in response to excitation from the single pump laser.

2. The apparatus for 3D volumetric display of claim 1, wherein the enclosed volume holds the noble gas as the gain medium without suspended particles.

3. The apparatus for 3D volumetric display of claim 1, wherein the enclosed volume holds the noble gas as the gain medium without suspended fluorophore particles.

4. The apparatus for 3D volumetric display of claim 1, wherein the voltage is applied to the two electrodes to reach but not exceed a level where the noble gas begins to glow.

5. The apparatus for 3D volumetric display of claim 1, wherein no heat is applied to excite electrons of the gain medium.

6. The apparatus for 3D volumetric display of claim 1, wherein the excited state is a metastable state and wherein the luminescence is in response to two-photon excitation from the pump laser.

7. The apparatus for 3D volumetric display of claim 1, wherein the laser beam will be absorbed at an edge of the gain medium when pumping at a wavelength that is within the absorption line of the gain medium.

8. The apparatus for 3D volumetric display of claim 1, wherein no emission occurs when the laser beam is not focused within the gain medium.

9. The apparatus for 3D volumetric display of claim 1, wherein:
different pumping wavelengths are used to create different wavelengths of illumination,
a blue-type second wavelength of between 450 nanometers and 495 nanometers is emitted in response to a pumped first wavelength of between 900 nanometers and 990 nanometers,
a green-type second wavelength of between 495 nanometers and 570 nanometers is emitted in response to a pumped first wavelength of between 990 nanometers and 1140 nanometers, and
a red-type second wavelength of between 620 nanometers and 750 nanometers is emitted in response to a pumped first wavelength of between 1240 nanometers and 1500 nanometers.

10. A system, comprising:
a vehicle;
a 3D volumetric display apparatus coupled to the vehicle, the 3D volumetric display comprising:
a transparent enclosed volume to hold a noble gas as a gain medium;
two electrodes, positioned on opposing sides of the transparent enclosed volume, to apply a voltage to excite electrons of the gain medium to an excited state;
a single pump laser configured to emit a laser beam into the gain medium at a wavelength that has an energy below an absorption line of the gain medium to allow for photon collision while also allowing the laser beam to enter the gain medium; and
a lens configured to focus the laser beam to a focused spot within the transparent enclosed volume, wherein the lens is configured to move the focused spot at various depths, and the single pump laser is configured to move the focused spot in an X dimension and a Y dimension, wherein the lens and single pump laser operate together to move the focused spot within the gain medium as a three-dimensionally scanned voxel to produce a 3D image,
wherein the gain medium with excited electrons is configured to receive the laser beam having a pumped wavelength at a first wavelength and configured to emit a second wavelength that is one-half of the first wavelength as luminescence, wherein the luminescence is in response to excitation from the single pump laser.

11. The system of claim 10, wherein the enclosed volume holds the noble gas as the gain medium without suspended fluorophore particles.

12. The system of claim 10, wherein the voltage is applied to the two electrodes to reach but not exceed a level where the noble gas begins to glow.

13. The system of claim 10, wherein no heat is applied to excite electrons of the gain medium to the excited state.

14. The system of claim 10, wherein the excited state is a metastable state and wherein the luminescence is in response to two-photon excitation from the pump laser.

15. The system of claim 10, wherein the laser beam will be absorbed at an edge of the gain medium when pumping at a wavelength that is within the absorption line of the gain medium.

16. The system of claim 10, wherein no emission occurs when the laser beam is not focused within the gain medium.

17. A method for 3D volumetric display, comprising:
holding a noble gas, via a transparent enclosed volume, as a gain medium;
applying a voltage, via two electrodes positioned on opposing sides of the transparent enclosed volume, to excite electrons of the gain medium to an excited state;
emitting a laser beam, via a single pump laser, into the gain medium at a wavelength that has an energy below an absorption line of the gain medium to allow for photon collision while also allowing the laser beam to enter the gain medium; and focusing the laser beam, via a lens, to a focused spot within the transparent enclosed volume, wherein the lens is configured to move the focused spot at various depths, and the pump laser is configured to move the focused spot in an X dimension and a Y dimension, wherein the lens and single pump laser operate together to move the focused spot within the gain medium as a three-dimensionally scanned voxel to produce a 3D image, wherein the gain medium with excited electrons receives the laser beam having a pumped wavelength at a first wavelength and emits a second wavelength that is one-half of the first wavelength as luminescence, wherein the luminescence is in response to excitation from the single pump laser.

18. The method of claim 17, wherein the enclosed volume holds the noble gas as the gain medium without suspended fluorophore particles.

19. The method of claim 17, wherein no heat is applied to excite electrons of the gain medium to the excited state.

20. The method of claim 17, wherein the excited state is a metastable state and wherein the luminescence is in response to two-photon excitation from the pump laser.

* * * * *